CALL DATA RECORDING TELEPHONE SYSTEM

Filed Dec. 16, 1947 9 Sheets-Sheet 1

INVENTOR
R. E. HERSEY
BY R. Marino
ATTORNEY

Dec. 25, 1951 R. E. HERSEY 2,580,093

CALL DATA RECORDING TELEPHONE SYSTEM

Filed Dec. 16, 1947 9 Sheets-Sheet 2

INVENTOR
R. E. HERSEY
BY R. Marino
ATTORNEY

INVENTOR
R. E. HERSEY
BY R. Marino
ATTORNEY

INVENTOR
R.E. HERSEY
BY R. Marino
ATTORNEY

INVENTOR
R.E. HERSEY
BY R. Marino
ATTORNEY

INVENTOR
R. E. HERSEY
BY R. Marino
ATTORNEY

Dec. 25, 1951 R. E. HERSEY 2,580,093

CALL DATA RECORDING TELEPHONE SYSTEM

Filed Dec. 16, 1947 9 Sheets-Sheet 7

INVENTOR
R.E. HERSEY
BY R. Mariño
ATTORNEY

Dec. 25, 1951 R. E. HERSEY 2,580,093

CALL DATA RECORDING TELEPHONE SYSTEM

Filed Dec. 16, 1947 9 Sheets-Sheet 8

INVENTOR
R. E. HERSEY
BY R. Marino
ATTORNEY

Dec. 25, 1951 R. E. HERSEY 2,580,093

CALL DATA RECORDING TELEPHONE SYSTEM

Filed Dec. 16, 1947 9 Sheets-Sheet 9

INVENTOR
R.E. HERSEY
BY R. Marino
ATTORNEY

Patented Dec. 25, 1951 2,580,093

UNITED STATES PATENT OFFICE 2,580,093

CALL DATA RECORDING TELEPHONE SYSTEM

Ralph E. Hersey, Madison, N. J., assignor to Bell Telephone Laboratories, Incorporated, New York, N. Y., a corporation of New York Application December 16, 1947, Serial No. 792,046

9 Claims. (Cl. 179—7.1)

This invention relates to telephone systems and more particularly to systems for recording information relating to telephone calls.

In automatic message accounting systems for telephone offices, the essential information required to be recorded for each completed call comprises an identification of the calling line, the designation of the station called, the time of answer, and the time of disconnect. The designation of the station called is ordinarily registered in a sender, but means must be provided for identifying the calling line and for transmitting said identification, as well as the designation of the station called, to a recording device. The times of answer and disconnect cannot, of course, be recorded until those events occur, and these records must be accompanied by some indication, such as an identification of the calling line, that will enable them to be associated with the call to which they relate.

The present invention discloses a novel system in which the calling line is identified, whenever identification is required for the record, and the designation of the called station is obtained for recording, by time-spaced electrical impulses.

A feature of the invention is the common impulsing equipment for obtaining for recording purposes both the designation of the calling line and the designation of the called line.

Another feature of the invention is the use of a register responsive to said common impulsing equipment which has a digital registering capacity of less than the total number of digits to be registered and subsequently recorded, thus reducing the quantity of equipment ordinarily used for such purpose.

Another feature of the invention is the use of a common recorder for recording information in connection with all calls serially on a common medium.

These and other features of the invention will be more apparent from the accompanying description, the appended claims, and the drawing, in which:

In this invetnion, time-spaced impulses are used to indicate the digits to be recorded, and each digit is represented by two of five possible successive impulses, in accordance with the following code:

| Digit: | Impulses of group of five |
|---|---|
| 1 | 1st and 2nd |
| 2 | 1st and 3rd |
| 3 | 2nd and 3rd |
| 4 | 1st and 4th |
| 5 | 2nd and 4th |
| 6 | 3rd and 4th |
| 7 | 3rd and 4th |
| 8 | 1st and 5th |
| 9 | 2nd and 5th |
| 0 | 4th and 5th |

Figure 9:
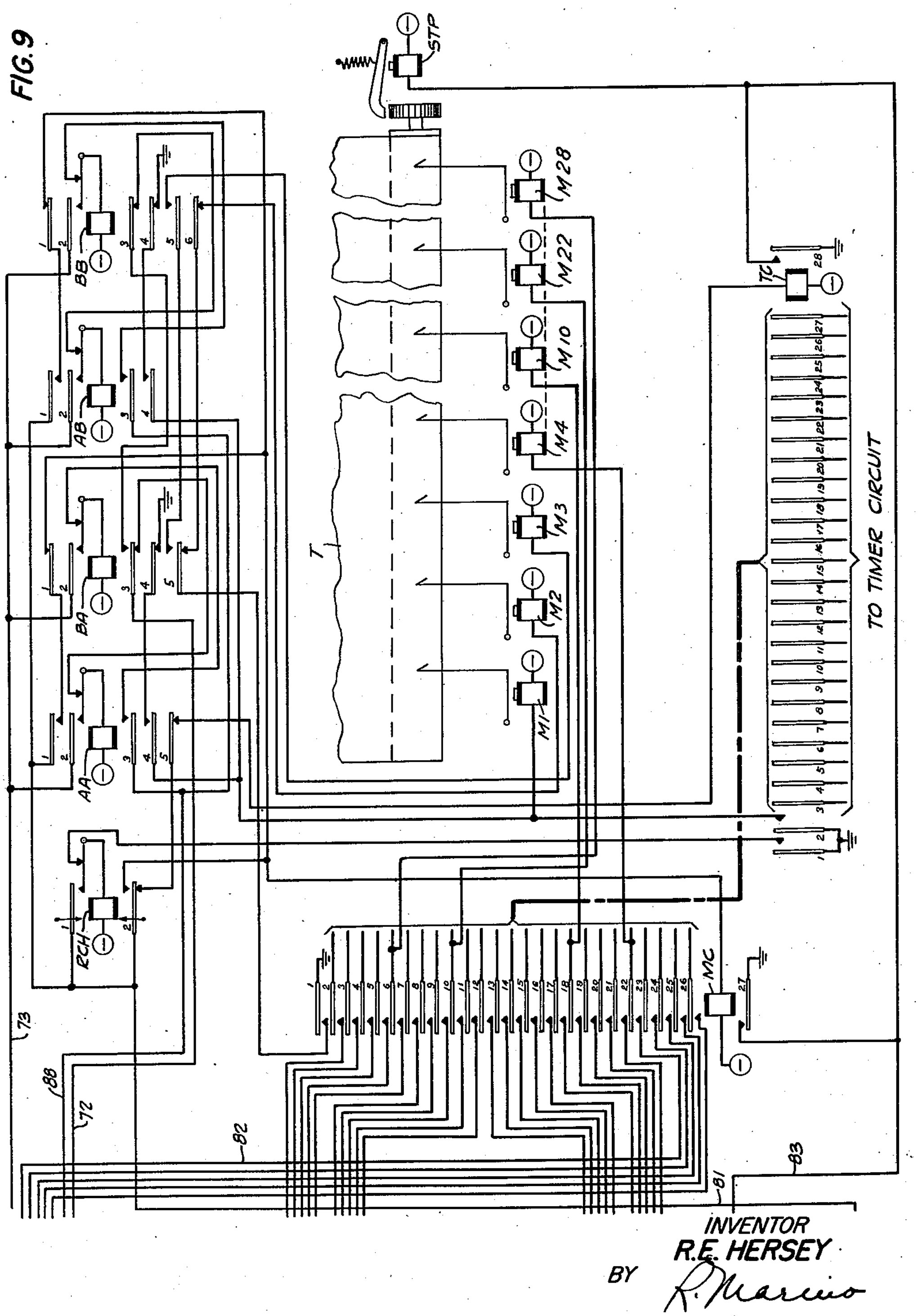
Fig. 9 shows the circuits of the recorder.

The digits so represented are recorded by correspondingly-spaced depressions punched in a paper tape by a suitable recorder, the circuits of which are shown in Fig. 9. For a more complete understanding of the construction and operation of a recorder of this type, reference may be had to the copending application of W. W. Carpenter, Serial No. 588,401 filed April 14, 1945.

Figures 1, 10:
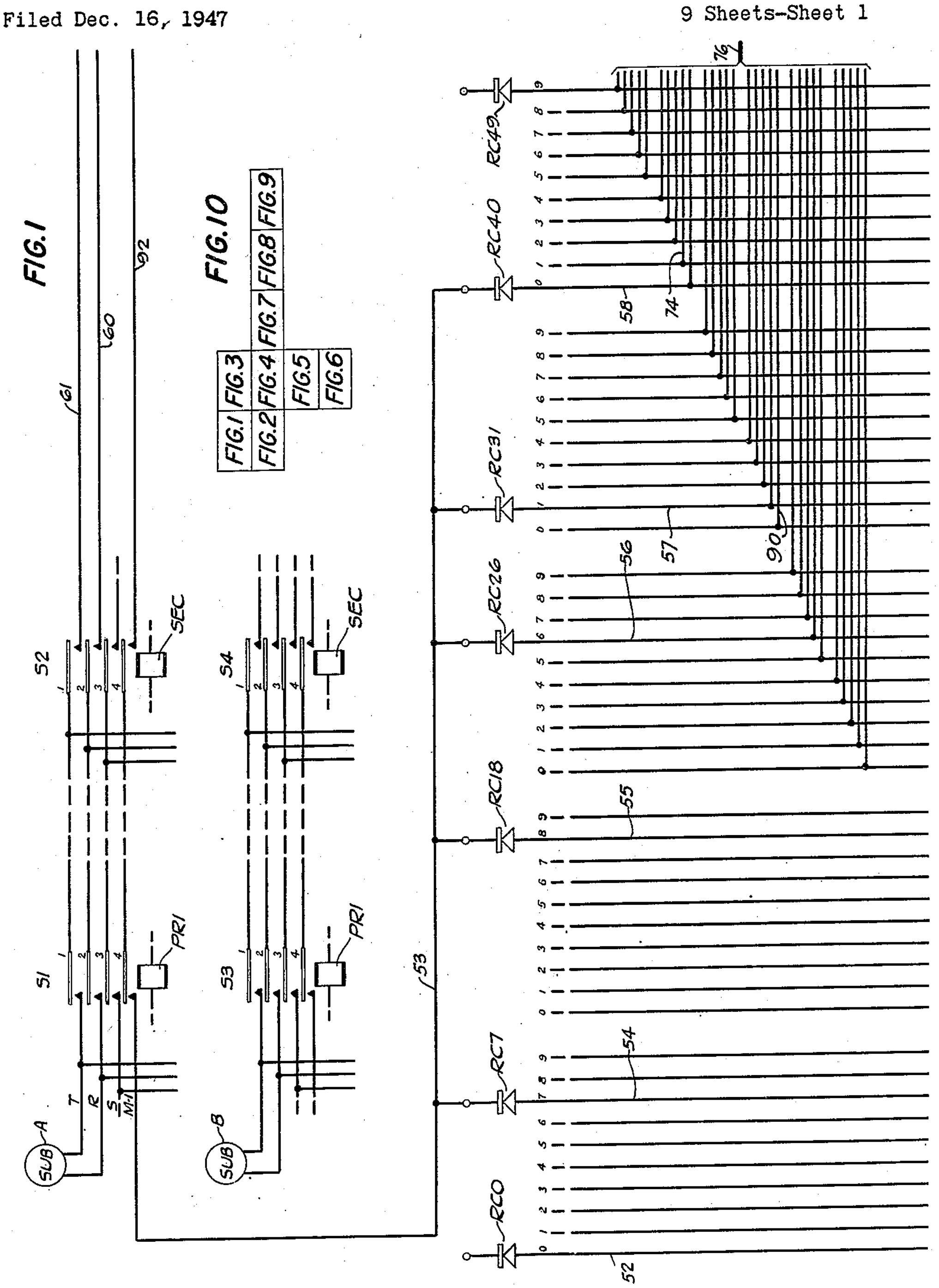
Fig. 1 shows line circuits and switches for extending calling lines.
Fig. 10 shows how the above figures should be placed in relation to one another to completely disclose the invention.
Figure 2:
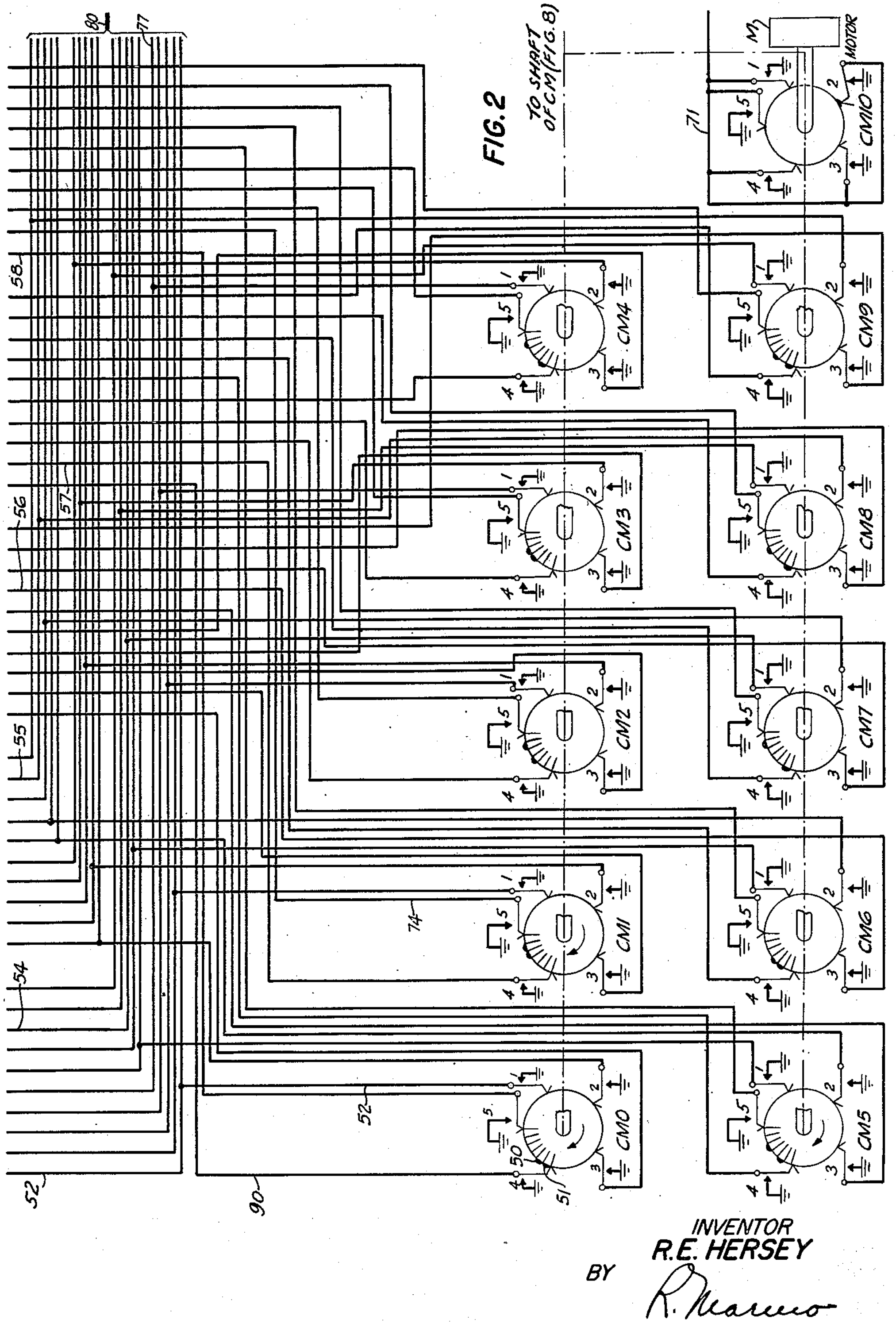
Fig. 2 shows the common impulse device.

In the present embodiment of the invention, time-spaced impulses are produced by the impulser shown in Fig. 2. This device comprises eleven cams CM0 . . . CM10 mounted on a common shaft and continuously rotated by motor M. Each of the ten cams CM0 . . . CM9 is assigned to the indication of a particular digit, for example, cam CM0 for digit "0," cam CM1 for digit "1," etc. Each cam has two projections thereon at two of five possible positions for said projections, corresponding to the code, as given above, for the digit to which the cam is assigned, and five equally-spaced sets of contacts responsive to said projections. For example, cam CM0, assigned to the digit "0," has two projections 50 and 51 so spaced thereon that, as said cam rotates and said projections encounter the No. 4 contacts of said cam, said contacts are twice closed at periods corresponding to the fourth and fifth periods of closure of any of the No. 4 contacts of cams CM0 . . . CM9. Similarly, as the projections 50 and 51 pass the No. 5 contacts of cam CM0 said contacts are closed at the fourth and fifth periods of closure of the No. 5 contacts of cams CM0 . . . CM9. A similar effect is produced at the No. 1, No. 2 and No. 3 contacts of said cam. Each of the cams CM1 . . . CM9 is similarly arranged in accordance with the code of the digit to which said cam is assigned. Cam CM10 has one projection thereon, which, as said cam rotates, closes the No. 1 contacts of said cam just before any of the No. 1 contacts of cams CM0 . . . CM9 close, and closes the No. 2 contacts of cam CM10 just before any of the No. 2 contacts of cams CM0 . . . CM9 close, etc.

Each of the conductors which is grounded by the closure of contacts of cams CM0 . . . CM9, such as conductor 52, for example, is provided with a rectifier RC0 poled to permit passage of negative potential to said contacts, but to oppose passage of positive potential.

In accordance with the present invention, a conductor of each subscriber's line, which may be the conductor ordinarily used to control a message register, is connected to conductors grounded by closure of contacts of cams CM0 . . . CM9 in accordance with a distinguishing designation of said line, which may be, for example, the directory number of said line. In the present illustration, the directory number of the line of station A is assumed to be "78610." Conductor 53 of said line is therefore connected through rectifier RC7 to conductor 54, which is the conductor grounded by closure of No. 1 contacts of cam CM7, in accordance with the first digit "7" of said directory number. Conductor 53 is also connected through rectifier RC18 to conductor 55, which is the conductor grounded by the No. 2 contacts of cam CM8, in accordance with the second digit "8" of said directory number. Likewise, conductor 53 is connected through rectifiers RC26, RC31, and RC40 respectively, to conductors 56, 57, and 58 in accordance with the last three digits "610" of the directory number and thence to contacts 3, 4 and 5, respectively, of the appropriate numerical cams.

While in the present embodiment of the invention, provision is made for line designations of five digits, it is obvious that connections may be made for any line, in the manner described above, for a designation of less than five digits and that, by obvious expansion of the arrangements shown, provision may be made for designations of more than five digits.

Figure 8:
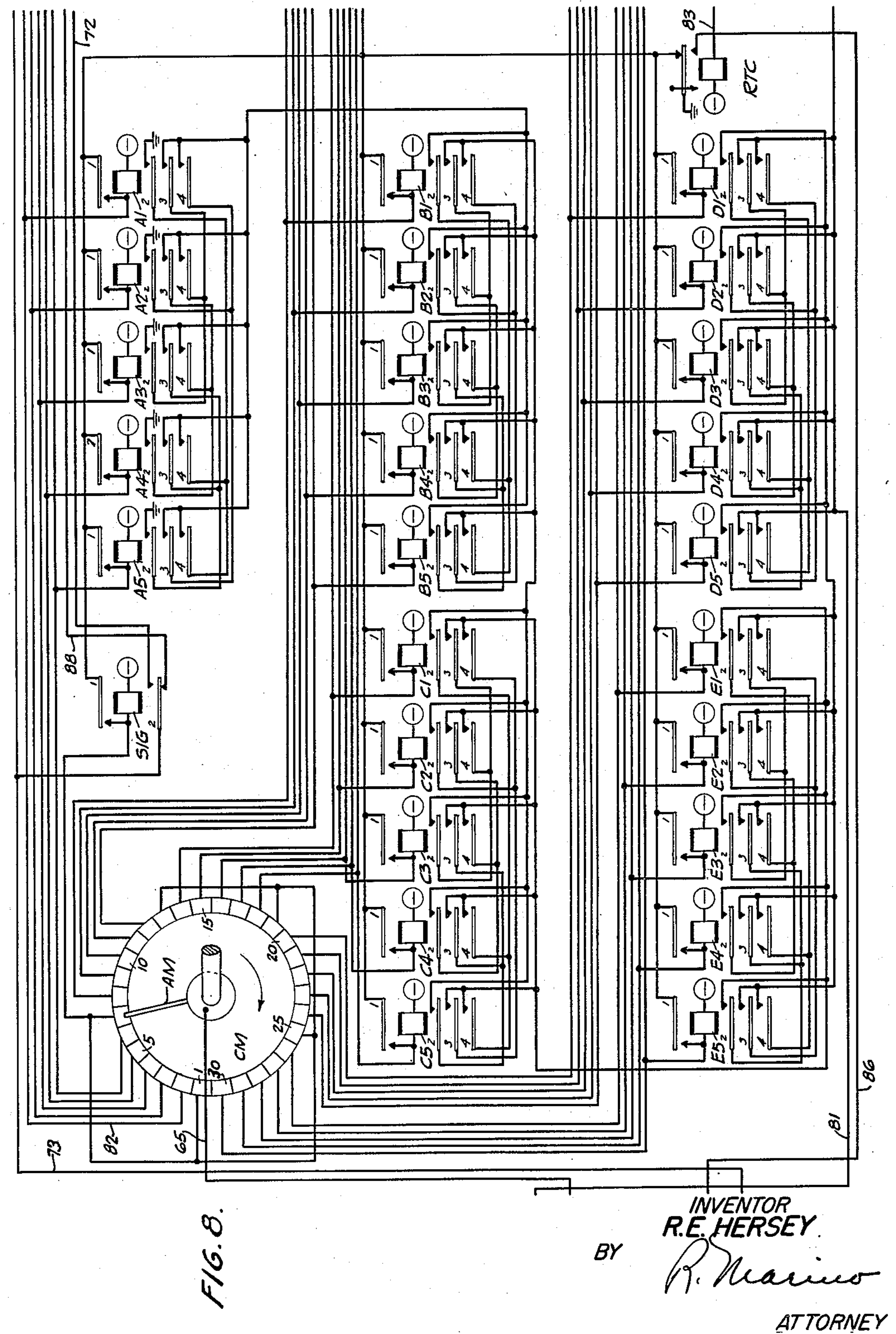
Fig. 8 shows register circuits and an associated commutator which, in the present embodiment of the invention, is part of the impulse device shown in Fig. 2.

The commutator CM is shown in Fig. 8 for convenience but is associated with the impulser of Fig. 2, and its arm AM is continuously rotated by motor M. Said arm is so adjusted that it engages the No. 1 segment of said commutator when the No. 1 contacts of cam CM10 are closed by the projection of said cam. The number of segments required in commutator CM depends upon the maximum number of digits required to be controlled by said commutator. In the present embodiment of the invention, provision is made for controlling five digits through said commutator. It will be obvious that by suitable arrangement of the circuits and equipment, provision may be made for controlling more or less than five digits by said commutator.

Figure 3:
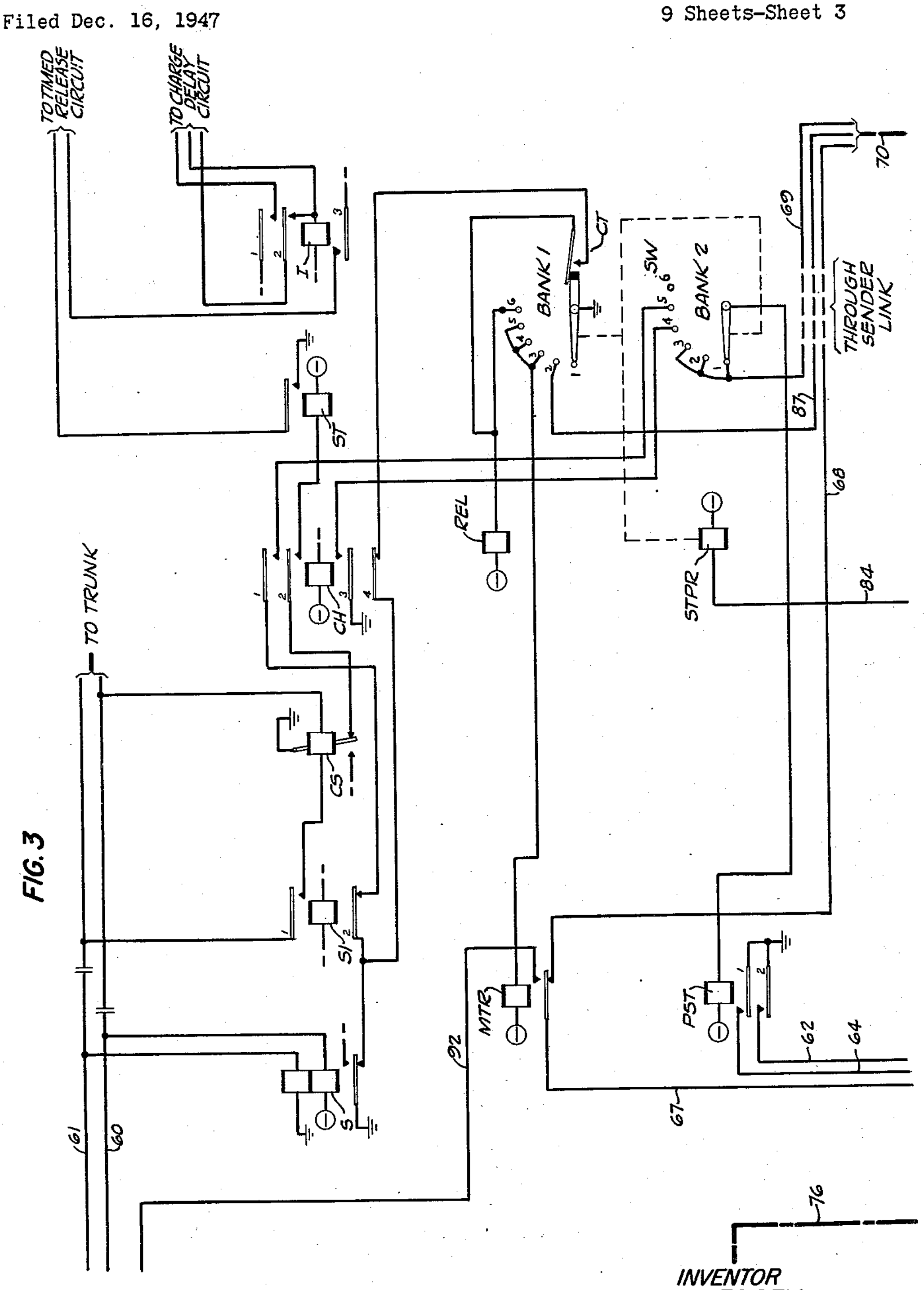
Fig. 3 shows a portion of a district junctor circuit.
Figure 4:
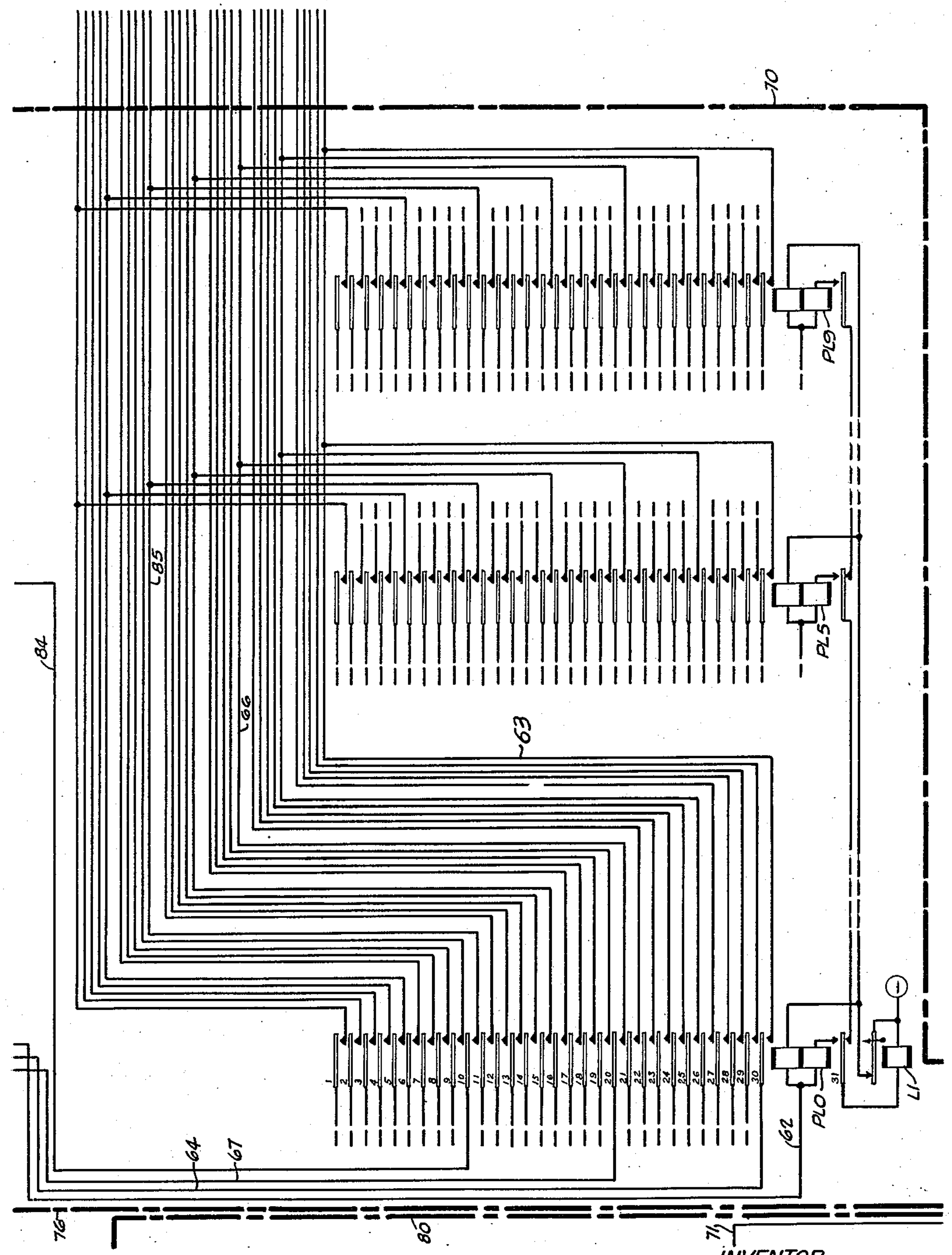
Figs. 4 and 7 show the circuits of the impulse connector.
Figure 5:
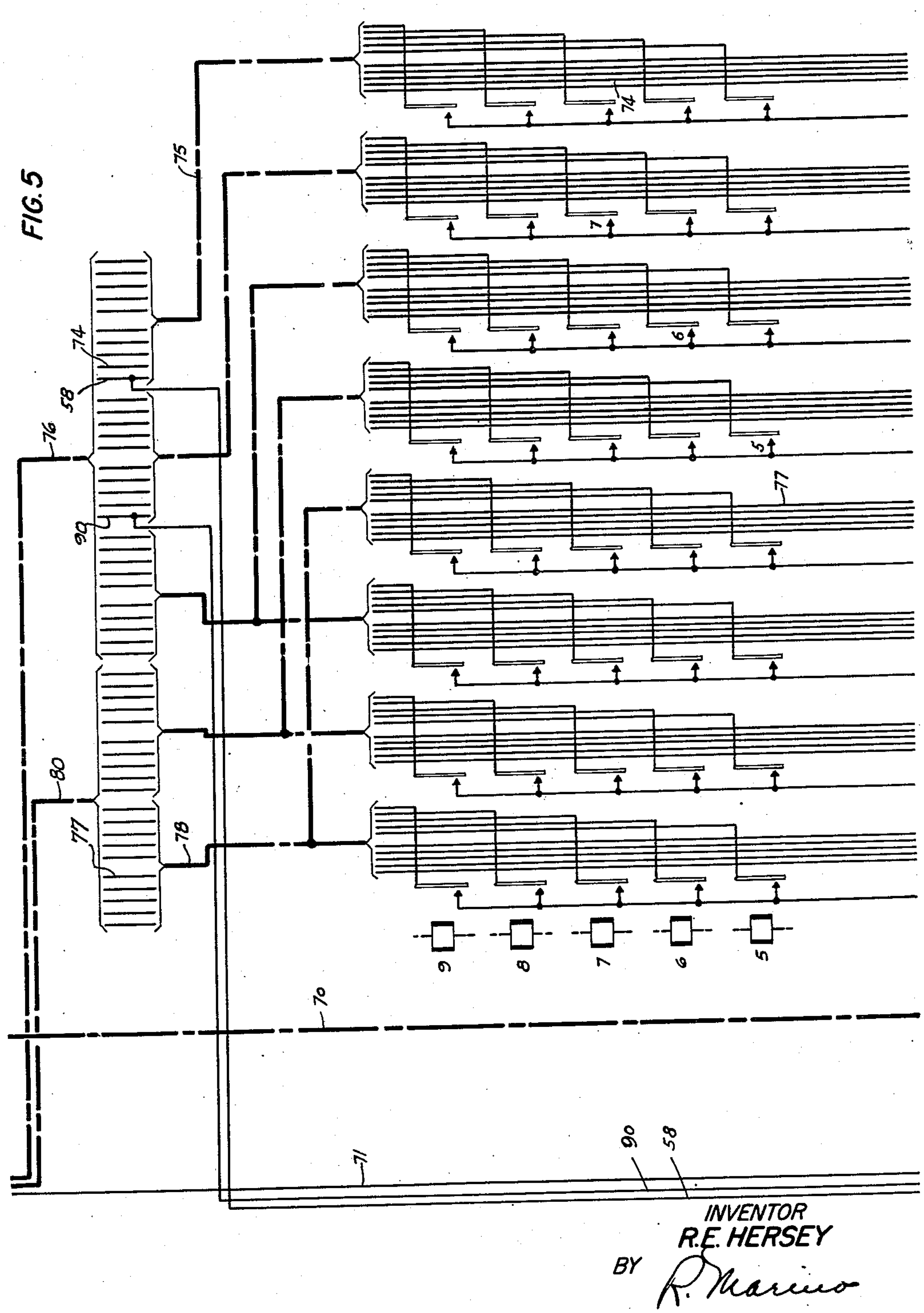
Figs. 5 and 6 show the register switches of the sender.
Figure 6:
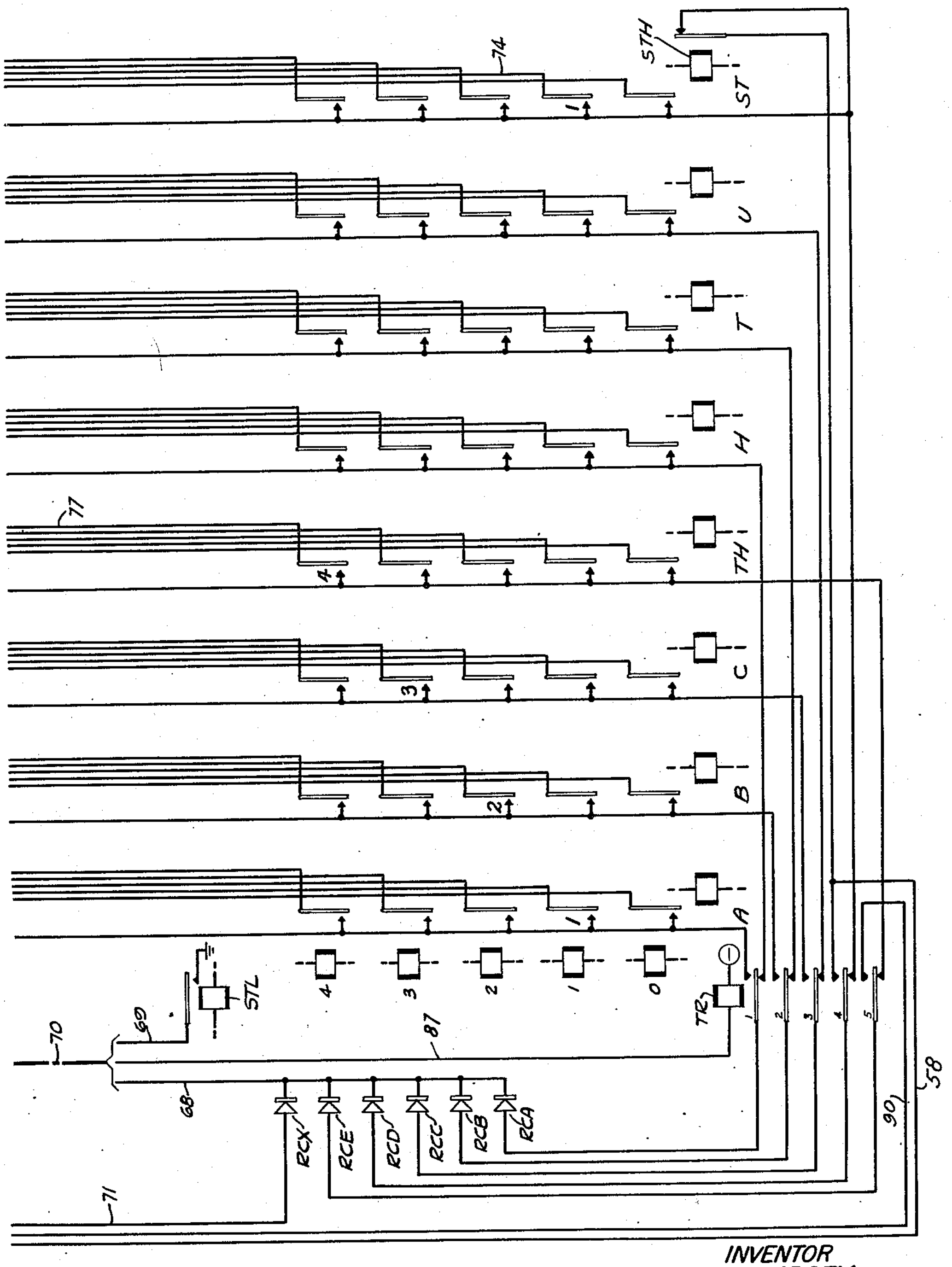
Figure 7:
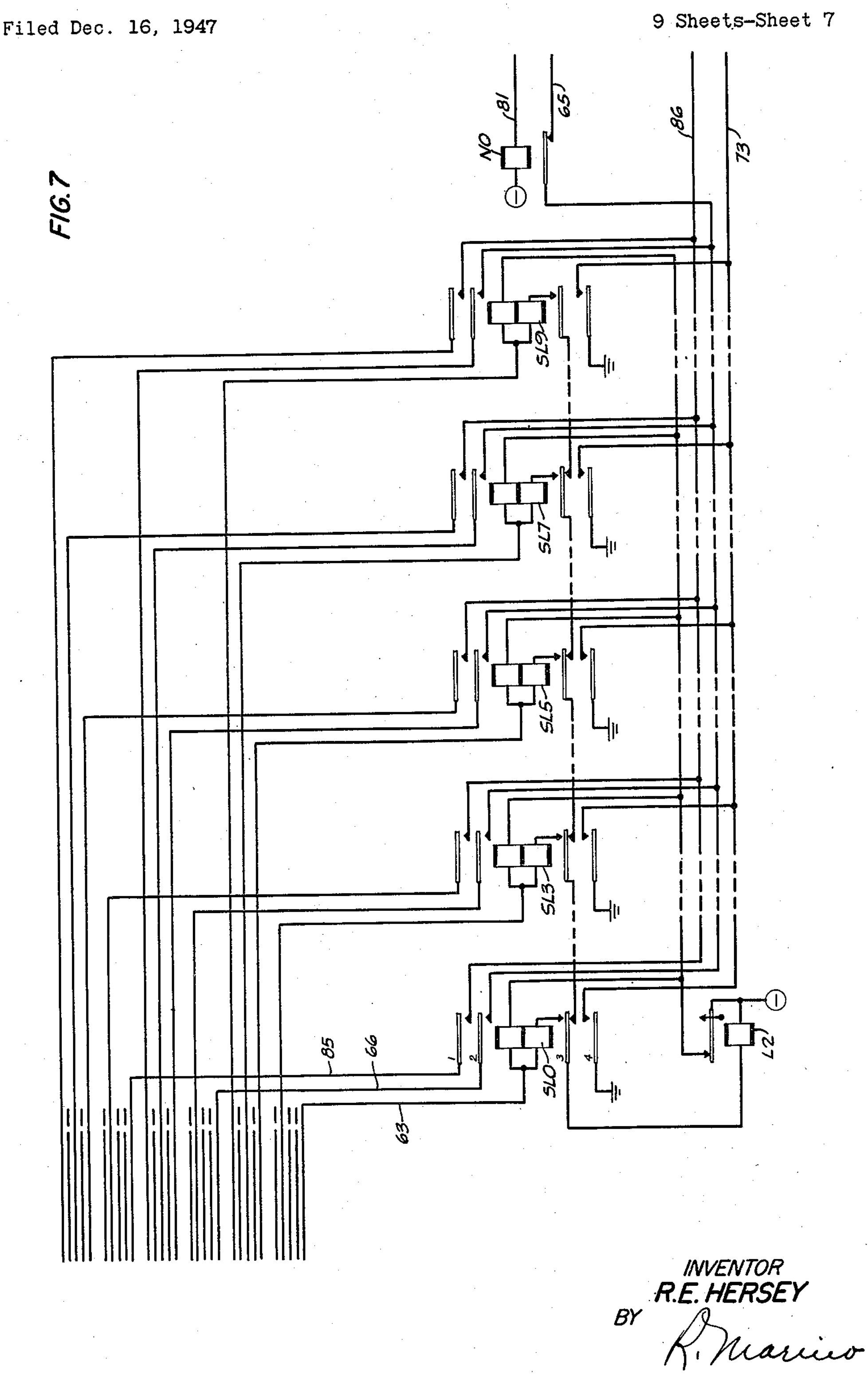

For a clear understanding of the invention, the operations in connection with a call from station A will be described. When a call is originated by the removal of the receiver at station A, the line of said station is extended in the usual manner by switches S1 and S2 to a district junctor circuit, for example, the circuit part of which is shown in Fig. 3, and is connected to a sender in which the called number dialed at station A is registered. The construction and operation of suitable circuits for performing these operations are so well known that it is not thought necessary to disclose them here nor to describe their operations in detail, reference may be had to the patent to W. W. Carpenter 2,235,803 dated March 18, 1941, for a more complete description of suitable circuits and apparatus for this portion of the system. When the calling line A has been extended to the district junctor, relay S operates over a circuit extending from battery through the lower winding of said relay, conductor 60, No. 2 contacts of switch S2, No. 2 contacts of switch S1, switchhook contacts of station A, No. 1 contacts of switch S1, No. 1 contacts of switch S2, conductor 61, and upper winding of relay S to ground. When relay STL of the sender operates in the usual manner at the completion of dialing, relay PST operates over a circuit extending from battery through the winding of said relay, arm and No. 1 terminal of bank No. 2 of switch SW, conductor 69 within bracket 70 and contacts of relay STL to ground. Relay PL0, associated with the district junctor circuit of Fig. 3, then operates over a circuit extending from battery through contacts of relay L1, upper winding of relay PL0, conductor 62, and No. 2 contacts of relay PST to ground, and locks up over a circuit extending from battery through the winding of relay L1, No. 31 front contacts and lower winding of relay PL0, conductor 62, and No. 2 contacts of relay PST to ground, over which circuit relay L1 also operates. Operation of relay L1 prevents the operation of any of relays PL1 . . . PL9 associated with other district junctor circuits. Relay SL0 operates over a circuit extending from battery through contacts of relay L2, upper winding of relay SL0, conductor 63, No. 30 contacts of relay PL0, conductor 64, and No. 1 contacts of relay PST to ground and locks up over a circuit extending from battery through the winding of relay L2, No. 3 front contacts and lower winding of relay SL0 to the same ground, over which circuit relay L2 also operates. Operation of relay L2 prevents the operation of relays SL1 . . . SL9 associated with other senders district junctors.

When, now, the projection on cam CM10 closes one of the contacts of said cam, for example, the No. 5 contacts, the arm AM of commutator CM will be on the No. 25 segment of said commutator and a circuit is completed from battery through the winding of relay SIG, No. 25 segment and arm AM of commutator CM, conductor 65, contacts of relay NO, No. 2 contacts of relay SL0, conductor 66, No. 20 contacts of relay PL0, conductor 67, back contacts of relay MTR, conductor 68 with bracket 70, rectifier RCX, conductor 71, and No. 5 contacts of cam CM10 to ground, over which relay SIG operates and locks up through its No. 1 contacts and back contacts of relay RTC to ground. Relay AA then operates over a circuit extending from battery through the winding and No. 2 normal contacts of said relay, No. 3 back contacts of relay BA, conductor 72, No. 2 front contacts of relay SIG, conductor 73, and No. 4 contacts of relay SL0 to ground, and locks up through its No. 2 front contacts and conductor 73 to the same ground.

Switches A, B, C, TH, H, T, U, and ST are the cross bar type register switches of the sender by which the dialing at station A is registered in the well-known manner. Assuming, for example, that the number dialed is "12345671," it is registered by the closure of the No. 1 contacts of switch A, the No. 2 contacts of switch B, the No. 3 contacts of switch C, the No. 4 contacts of switch TH, the No. 5 contacts of switch H, the No. 6 contacts of switch T, the No. 7 contacts of switch U, and the No. 1 contacts of switch ST. For a more complete description of the registration in this manner of the number dial from the calling station, reference may be had to the above-mentioned patent to Carpenter. When the arm AM of commutator CM now reaches the No. 26 segment of said commutator, the No. 5 contacts of cam CM1 are closed by one of the projections on said cam. A circuit is thereby completed from battery through the winding of relay E1, No. 26 segment and arm AM of commutator CM, conductor 65, contacts of relay NO, No. 2 contacts of relay SL0, conductor 66, No. 20 contacts of relay PL0, conductor 67, back contacts of relay MTR, conductor 68 within bracket 70, rectifier RCD, No. 4 back contacts of relay TR, No. 1 contacts of switch ST, conductor 74 within brackets 75 and 76, and No. 5 contacts of cam CM1 to ground, over which relay E1 operates and locks up through its No. 1 contacts and back contacts of relay RTC to ground. When the arm AM of commutator CM reaches the No. 27 segment of said commutator, the No. 5 contacts of cam CM1 are likewise closed. Relay E2 then operates over a circuit extending from battery through the winding of said relay, No. 27 segment and arm AM of commutator CM and the circuit traced above, to ground and locks up through its No. 1 contacts and back contacts of relay RTC to ground. When the arm AM of commutator CM reaches the No. 28 segment, the No. 5 contacts of cam CM1 are not closed and no circuit is completed either through said contacts or through other register switches and contacts of other cams, since the contacts of said other register switches are connected only to No. 1 . . . . No. 4 contacts of cams CM0 . . . . CM9, none of which contacts are closed at this time. Likewise when the arm AM of commutator CM reaches the No. 29 and No. 30 segments, no circuits are closed. By the above operation, relays E1 and E2 are operated and locked up. These relays, the first and second relays of the group of relays E1 . . . E5, correspond, according to the code previously given, to the digit "1" which is thereby registered as the last digit dialed at station A.

If but seven digits had been dialed at station A, as in calling a line without station designation, no digit would have been registered by switch ST and the hold magnet STH of said switch would not be operated. A circuit would then be completed from conductor 68 through rectifier RCD, No. 4 back contacts of relay TR, contacts to hold magnet STH, and conductor 58 within bracket 76 to the No. 5 contacts of cam CM0. The digit registered by relays E1 . . . E5 would then be "0" since the contacts of cam CM0 close in positions corresponding, in accordance with the code given above, to said digit. The digit zero in this position indicates that the line called has no station designation.

As the arm AM of commutator CM passes over the No. 1 segment, no material effect is produced, but when said arm reaches the No. 2 segment, a circuit is completed from battery through the winding of relay A1, No. 2 segment and arm of commutator CM, conductor 65, contacts of relay NO, No. 2 contacts of relay SL0, conductor 66, No. 20 contacts of relay PL0, conductor 67, contacts of relay MTR, conductor 68 within bracket 70, rectifier RCE, No. 5 back contacts of relay TR, No. 4 contacts of switch TH, conductor 77 within brackets 78 and 80, and No. 1 contacts of cam CM4, which are closed at this time, to ground, over which relay A1 operates and locks up through its No. 1 contacts and back contacts of relay RTC to ground. When the arm AM of commutator CM passes the No. 2 and No. 3 segments, no circuits are closed. When said arm reaches the No. 4 segment, however, the No. 1 contacts of cam CM4 are closed and a circuit is completed from battery through the winding of relay A4, No. 4 segment and arm AM of commutator CM, thence, over the circuit traced above, to ground, over which relay A4 operates and locks up through its No. 1 contacts and back contacts of relay RTC to ground. Relays A1 and A4 operated register, in accordance with the code previously given, the digit "4" as the fourth digit dialed at station A.

In like manner, as the arm AM of commutator CM continues to rotate, relays B2 and B4 are operated and locked up to register the fifth digit "5" dialed at station A and registered by switch H. Relays C3, C4, D1, and D5 are similarly operated and locked up to register the sixth and seventh digits "67" dialed at station A and registered by switches T and U, respectively. By the operation of the above-mentioned register relays, a circuit is completed from battery through the winding of relay NO, conductor 81, No. 4 contacts of relay D5, No. 2 contacts of relay D1, No. 4 contacts of relay E1, No. 2 contacts of relay E2, No. 4 contacts of relay C3, No. 2 contacts of relay C4, No. 3 contacts of relay B2, No. 2 contacts of relay B4, No. 4 contacts of relay A4, and No. 2 contacts of relay A1 to ground, over which relay NO operates, opening the previously-traced circuit through commutator CM. Relay MC operates over a circuit extending from battery through the winding of said relay, No. 1 contacts of relay BA, No. 1 contacts of relay AA and conductor 81, thence, over the circuit traced above for relay NO, to ground. The circuits of relays NO and MC will not be completed, said relays will not operate, and the impulse circuit through commutator CM will remain effective unless or until two relays of each of the groups A1 . . . A5, B1 . . . B5, C1 . . . C5, D1 . . . D5, and E1 . . . E5 are operated, as described above.

When relay MC operates, punch magnets M1 . . . M28 of the recorder operate in accordance with the register relays operated. For example, punch magnet M4 operates over a circuit extending from battery through the winding of said magnet, No. 22 contacts of relay MC, conductor 82, No. 1 contacts of relay A1, and back contacts of relay RTC to ground. The combination of punch magnets so operated corresponds to the combination of register relays operated which, as described above, corresponds to the digits "45671" dialed at station A. Said operated punch magnets punch in the tape T of the recorder a corresponding arrangement of holes or depressions, thereby recording said digits. Punch magnet M1 is also operated over a circuit extending from battery through the winding of said magnet, No. 4 contacts of relay AA, and No. 4 contacts of relay BA to ground, punching a single hole which indicates that additional associated information is to be recorded on another line of the tape of the recorder.

When relay MC operates, the stepping magnet STP of the recorder operates over a circuit extending from battery through the winding of said magnet and No. 27 contacts of relay MC to ground, but performs no function at this time. A circuit is also completed from battery through the winding of relay RTC, conductor 83, and No. 27 contacts of relay MC to ground. Relay RTC operates over said circuit but is slow to operate so that its operation is delayed until after the punch magnets have operated. Operation of relay RTC opens the locking circuits of the operated register relays and relay SIG, releasing said relays which, in turn, release the operated punch magnets (except magnet M1), and relay NO. A circuit is also completed from battery through the winding of the stepping magnet STPR of switch SW, conductor 84, No. 10 contacts of relay PL0, conductor 85, No. 1 contacts of relay SL0, conductor 86, and front contacts of relay RTC to ground over which said stepping magnet operates, moving the arms of switch SW to the No. 2 terminals. Relay TR then operates over a circuit extending from battery through the winding of said relay, conductor 87 within bracket 70, and No. 2 terminal and arm of bank No. 2 of switch SW to ground.

Upon the release of relay SIG, as described above, relay BA operates over a circuit extending from battery through the winding and No. 2 normal contacts of said relay, No. 3 contacts of relay AA, conductor 88, No. 2 back contacts of relay SIG, conductor 73, and No. 4 contact of relay SL0 to ground and locks up through its No. 2 front contacts to the same ground. The No. 1 contacts of relay BA open the circuit of and release relay MC and the No. 4 contacts of relay BA open the circuit of and release punch magnet M1. The No. 27 contacts of relay MC open the circuit of and release the stepping magnet STP of the recorder, which, in releasing, moves the recorder tape T to a position for punching a new line. By the release of relay MC, the circuit of relay RTC is also opened and said relay released, opening the circuit of and releasing the stepping magnet STPR of switch SW.

By the release of relay NO, the impulse circuit, previously traced through commutator CM, again becomes effective and, during a revolution of the arm AM of said commutator, register relays are operated and locked up in the manner previously described. However, by the operation TR, register switches A, B, and C are now included in said circuit in the order named, instead of register switches TH, H, T, U, and ST while the digit "0" is arbitrarily added after the digit C in the fourth and fifth digital orders to "fill up" the five digital registers, it being understood that if the number being registered is composed of less than five digits the difference will be supplied by zeros. The combination of relays A1 . . . A5 operated and locked up is, therefore, that representing the digit "1," which is the first digit dialed at station A and registered by switch A. Likewise, the combination of relays B1 . . . B5 operated and locked up corresponds to the second digit "2" dialed at station A which is registered by switch B, and the combination of relays C1 . . . C5 operated and locked up corresponds to the third digit "3" dialed at station A which is registered by switch C.

In the case of register switch TH, a circuit is completed from conductor 68 through rectifier RCE and No. 5 front contacts of relay TR to conductor 90 within bracket 76 which gives the same effect as if the No. 0 contacts of switch TH were closed. The combination of relays D1 . . . D5 operated and locked up, therefore, corresponds to the digit "0." Likewise, a circuit is completed from conductor 68 through rectifier RCD and No. 4 front contacts of relay TR to conductor 58 within bracket 76 which gives the same effect as if the No. 0 contacts of switch ST were closed. The combination of relay E1 . . . E5 operated and locked up, therefore, corresponds to the digit "0."

Relay SIG also operates over the circuit previously traced and relay AB operates over a circuit extending from battery through the winding and No. 2 normal contacts of said relay, No. 3 contacts of relay BB, No. 3 front contacts of relay BA, conductor 72, No. 2 front contacts of relay SIG, conductor 73, and No. 4 contacts of relay SL0 to ground and locks up through its No. 2 front contacts to the same ground. Relay MC operates over a circuit extending from battery through the winding of said relay, No. 1 contacts of relay BB, No. 1 contacts of relay AB, conductor 81, and contacts of the operated register relays to ground. The operated register relays then cause the operation of corresponding punch magnets of the recorder to record the digits "12300," in the manner previously described. The first three of these digits are the first three digits dialed at station A. Taken in conjunction with the first line recorded, there has now been recorded all the digits dialed at station A which, of course, constitute the designation of the called station. Punch magnet M1 also operates over a circuit extending from battery through the winding of said magnet, No. 4 contacts of relay AB, and No. 4 contacts of relay BB to ground recording a character to indicate that the present recorded line forms part of an entry containing more than one line. The operation of relays RTC and NO and the stepping magnet STP takes place as previously described, releasing the operated register relays, the operated punch magnets, and relay SIG. Upon the release of the latter relay, relay BB operates over a circuit extending from battery through the winding and No. 2 normal contacts of said relay, No. 3 contacts of relay AB, conductor 88, No. 2 back contacts of relay SIG, conductor 73, and No. 4 contacts of relay SL0 to ground and locks up through its No. 2 front contacts to the same ground. The No. 1 contacts of relay BB open the circuit of and release relay MC, releasing, in turn, relays RTC and NO and the stepping magnet STP which moves the tape T of the recorder to a position for punching a new line.

By the operation of relay RTC, as described above, a circuit is completed from battery through the winding of the stepping magnet STPR of switch SW, conductor 84, No. 10 contacts of relay PL0, conductor 85, No. 1 contacts of relay SL0, conductor 86, and front contacts of relay RTC to ground over which said stepping magnet operates, moving the arms of switch SW to the No. 3 terminals. Relay MTR then operates over an obvious circuit. Stepping magnet STPR releases when relay RTC releases, as described above.

A circuit is now completed from battery through the winding of relay SIG as previously traced to conductor 65 through contacts of relay NO, No. 2 contacts of relay SL0, conductor 66, No. 20 contacts of relay PL0, conductor 67, front contacts of relay MTR, conductor 92, No. 4 contacts of switches S2 and S1, conductor 53, and rectifiers RC7, RC16, RC25, RC31, and RC40 to contacts of the impulser. Upon rotation of the arm AM of commutator CM, combinations of register relays are again operated in the manner described above, but these combinations are now in accordance with the connections between conductor 53 and the contacts of the impulser which connections are, as previously described, made in accordance with the designation of the line of station A, and the register relays operated represent the digits "78610." The operated register relays cause the operation of corresponding punch magnets of the recorder in the manner already described and the designation "78610" of the calling line is thereby recorded. Now, however, punch magnet M3 operates over a circuit extending from battery through the winding of said magnet, No. 5 contacts of relay BB, No. 5 front contacts of relay BA, and No. 1 contacts of relay MC to ground, punching a character which indicates that the present recorded line is the last line of the entry.

When relay RTC operates, stepping magnet STPR of switch SW operates over the circuit previously traced, moving the arms of switch SW to the No. 4 terminals. The circuit of relay PST is thereby opened and said relay released, opening the circuits of and releasing relays PL0 and SL0. Relays L1 and L2 are also released but these relays are slow to release and prevent operation of any of the relays PL0 . . . PL9 and SL0 . . . SL9 until relays PL0 and SL0 are fully released. Stepping magnet STPR releases when relay RTC releases and by the operation and release of relay RTC, stepping magnet STP of the recorder is operated and released, moving the tape T of the recorder to a position for punching a new line. By the release of relay SL0, the locking circuits of relays AA, BA, AB, and BB are opened and said relays released. The recorder is now free to be used for recording by other district junctors in the manner described above or in other ways, connection of said recorder to said junctors being made by the operation of relays PL1 . . . PL9 and SL1 . . . SL9.

When the called subscriber answers and the charge relay CH of the district junctor circuit operates in the usual manner, relay PST operates over a circuit extending from battery through the winding of said relay, arm and No. 4 terminal of bank No. 2 of switch SW, and No. 3 contacts of relay CH to ground, causing the operation of relays PL0 and SL0, in the manner previously described. Upon rotation of the arm AM of commutator CM, relay MTR being still operated, register relays are again operated in combination corresponding to the designation "78610" of the calling line. However, by the operation of relay MTR, the circuit of relay SIG, is opened and said latter relay does not now operate. This prevents the operation of relays AA and MC. Relay TC operates over a circuit extending from battery through the winding of said relay, No. 5 contacts of relay AA, No. 2 back contacts of relay RCH, and contacts of operated register relays in series to ground. Relay TC connects conductors from a timer circuit of any suitable well-known type to windings of the punch magnets of the recorder. A combination of said punch magnets corresponding to the conductors grounded by said timing circuit at the moment in accordance with the current time is thereby operated to record digits representing said current time. Punch magnet M1 also operates over an obvious circuit through No. 2 contacts of relay TC to ground, punching, as before, a character to indicate that the present recorded line forms part of an entry of more than one line. Stepping magnet STP operates over an obvious circuit through No. 28 contacts of relay TC to ground. Relay RCH operates over a circuit extending from battery through the winding and No. 1 normal contacts of said relay, and No. 1 contacts of relay TC to ground and locks up through its No. 1 front contacts, conductor 81, and contacts of the operated register relays in series to ground, opening the circuit of and releasing relay TC which, in turn, releases the operated punch magnets. Relay RCH is made slow to operate to give time for the punch magnets to operate. Release of relay TC opens the circuit of and releases stepping magnet STP which moves the tape T of the recorder to a position for punching another line.

Relay MC now operates over a circuit extending from battery through the winding of said relay, No. 2 front contacts of relay RCH, conductor 81, and contacts of the operated register relays in series to ground, connecting the punch magnets of the recorder to the register relays. Combinations of punch magnets corresponding to the operated register relays and, therefore, to the designation "78610" of the calling line, are thereby operated to record said designation. Punch magnet M2 also operates over a circuit extending from battery through the winding of said magnet, No. 6 contacts of relay BB, No. 5 back contacts of relay BA, and No. 1 contacts of relay MC to ground, recording a character which indicates that the recorded information relates to the answer of the called subscriber. Upon the operation of relay RTC, the operated register relays and punch magnets and relay MC are released, as previously described, and stepping magnet STPR of switch SW operates over the circuit previously traced, moving the arms of switch SW to the No. 5 terminals. The circuit of relay PST is thereby opened and said relay released, releasing, in turn, relays PL0 and SL0. Operation and release of the stepping magnet STP moves the tape T of the recorder to a position for punching another line. The recorder is now free to be used by other district junctors.

When the receiver is restored at station A at the completion of the conversation, the circuit of relay S is thereby opened and said relay released. When relay S1 is also released in the usual manner either by the called subscriber or by the usual timed-release circuit, relay PST operates over a circuit extending from battery through the winding of said relay, arm and No. 5 terminal of bank No. 2 of switch SW, No. 1 contacts of relay CH, No. 2 contacts of relay S1, and back contacts of relay S to ground, again operating relays PL0 and SL0 in the manner previously described. A repetition of the operations described above in connection with the answer of the called subscriber then takes place, recording again the current time on one line and the designation "78610" of the calling line on a second line. When relay RTC operates, stepping magnet STPR of switch SW again operates, moving the arms of switch SW to the No. 6 terminals. The release magnet REL of switch SW then operates over an obvious circuit, returning the arms of switch SW to the No. 1 terminals. The circuits are then free for similar operations in connection with other calls.

By the operations described above, the essential information in regard to the call, comprising in one entry the designation of the called station and the designation of the calling line, in another entry, the time of answer of the called subscriber and the designation of the calling line, and in a third entry, the time of disconnect and the designation of the calling line, is recorded. The three entries may be associated by the designation of the calling line appearing in each. It will be understood that a call from any other station through any other district junctor and with any other sender of the system will be similarly recorded by the recorder and associated equipment shown.

The contacts CT are closed whenever the arms of switch SW are not on the No. 1 terminals. In the case of a call abandoned before the answer of the called subscriber, relay CH will not be operated and contacts CT will be closed. Then, when relay S is released by restoring the receiver at the calling station, the release magnet REL of switch SW operates over a circuit extending from battery through the winding of said magnet, contacts CT, No. 4 contacts of relay CH, and back contacts of relay S to ground, restoring the arms of switch SW to the No. 1 terminals. The sender being disconnected at this time, all operated relays are released and further recording in connection with said call prevented.

What is claimed is:

1. In a telephone system, in combination with a called line and a calling line each having a numerical designation composed of a number of digits, a sender settable to register the numerical designation of said caled line, an impulser producing time-spaced impulses connected to said calling line in accordance with its numerical designation and to said sender, a register having a digital registering capacity less than the total number of said digits and repetitively operable by said impulser to register the digits of said called line designation under the control of said sender and the digits of said calling line designation under the control of said calling line connection, and a recorder responsive to the operations of said register for recording in succession the digits of said called line designation and the digits of said calling line designation.

2. In a telephone system, in combination with a calling line and a called line each having an individual designation composed of digits, a sender, an impulser producing time-spaced impulses, connections between said impulser, said sender and said calling line, the connection between said impulser and said calling line being in accordance with the latter's individual designation, a register having a digital registering capacity of less than the total number of said digits, means responsive to the registration of said called line designation in said sender for operating said register under the control of said impulser, thereby to register the designation of said called line therein, a recorder, means responsive to the operation of said register for operating said recorder to record said called line designation, means effective subsequent to the operation of said recorder for discharging said register and for applying a potential to the connection between said calling line and said impulser, thereby to reoperate said register under the control of said impulser to register said calling line designation therein, and means responsive to the last-mentioned operation of said register for reoperating said recorder to record the designation of said calling line.

3. In a telephone system, in combination with a calling line and a called line each having an individual designation composed of digits, a sender, an impulser producing time-spaced impulses, connections between said impulser, said sender and said calling line, the connection between said impulser and said calling line being in accordance with the latter's individual designation, a register having a digital registering capacity of less than the total number of said digits, a single conductor connectable between said register and said impulser, means responsive to the registration of said called line designation in said sender for operating said register under the control of said impulser and over said single conductor to register the designation of said called line, a recorder, means responsive to the operation of said register for operating said recorder to record said called line designation, means effective subsequent to the operation of said recorder for discharging said register and for applying a potential to the connection between said calling line and said impulser, thereby to reoperate said register under the control of said impulser and over said single conductor to register said calling line designation, and means responsive to the last-mentioned operation of said register for reoperating said recorder to record the designation of said calling line.

4. In a telephone system, in combination with a calling line having a numerical designation consisting of a number of digits, a called line having a numerical designation consisting of the same or different number of digits designating the office in which said line is located and the same or different number of digits designating the directory number of said line in said office, a sender settable to register the numerical designation of said called line, an impulser producing time-spaced impulses connected to said calling line in accordance with its numerical designation and to said sender, a register having a registering capacity equal to the maximum number of digits in any one of said numbers and repetitively operable by said impulser to register under the control of said sender the digits of the number designating said called office and the digits designating the directory number of said called line, and to register under the control of said calling line connection the digits constituting the numerical designation of said calling line, and a recorder responsive to each operation of said register for recording on different portions of the recording medium the directory number of said called line and an arbitrary character, the called office number and the same arbitrary character, and the calling line number and a different arbitrary character.

5. In a telephone system, in combination with a calling line having a numerical designation consisting of a number of digits, a called line having a numerical designation consisting of the same or different number of digits designating the office in which said called line is located and the same or different number of digits designating the directory number of said called line in said called office, a sender settable to register the numerical designation of said called line, an impulser producing time-spaced impulses connected to said calling line in accordance with its numerical designation and to said sender, a register having a registering capacity equal to the maximum number of digits in any one of said numbers and repetitively operable by said impulser to register under the control of said sender the digits of the number designating said called office and the digits designating the directory number of said called line therein, and to register under the control of said calling line connection the digits constituting the numerical designation of said calling line, and a recorder responsive to each operation of said register for recording in succession and on different portions of the recording medium the directory number of said called line and an arbitrary character, the called office number of said called line and the same arbitrary character, and the calling line number and a different arbitrary character.

6. In a telephone system, in combination with a calling line and a called line each having an individual designation composed of a number of digits, means for establishing and terminating a connection between said lines, a sender settable to register the designation of said called line, an impulser producing time-spaced impulses connected to said calling line in accordance with its individual designation and to said sender, a register having a digital registering capacity of less than the total number of said digits and repetitively operable under the control of said impulser to register said called line designation registered in said sender and to register said calling line designation over said calling line connection, a recorder responsive to each operation of said register for recording said called line designation, a timer, means responsive to the establishment of said connection, means responsive to said last-mentioned means for reoperating said register under the control of said impulser and over said calling line connection to register said calling line designation, means responsive to the last-mentioned operation of said register for establishing a connection from said recorder to said register and from said recorder to said timer, thereby to operate said recorder from said register to record said calling line designation and from said timer to record the time when said connection was established, means responsive to the termination of said connection, and means responsive to said last-mentioned means for reoperating said register under the control of said impulser and over said calling line connection to register said calling line designation, and to reestablish said connection between, said recorder and said register and said recorder and said timer, thereby to reoperate said recorder from said register to record said calling line designation and from said timer to record the time when said connection was terminated.

7. In a telephone system, in combination with a calling line and a called line each having an individual designation composed of digits, a sender settable to register the designation of said called line, an impulser connected to said calling line in accordance with the individual designation thereof and to said sender, said impulser being capable of producing coded series of impulses, each of said coded series of impulses representing a digit, and a register having a digital registering capacity of less than the total number of digits in the designation of both said calling line and said called line, said register being operable by said coded series of impulses to register in succession the digits of said called line designation and the digits of said calling line designation.

8. In a telephone system, in combination with a calling line and a called line each having an individual designation composed of digits, a sender settable to register the designation of said called line, an impulser connected to said calling line in accordance with the individual designation thereof and to said sender, said impulser being capable of producing a series of time-spaced impulses, each of said series of impulses representing a digit, and a register having a digit registering capacity of less than the total number of digits in the designation of both said calling line and said called line, said register being operable by said time-spaced impulses to register in succession the digits of said called line designation and the digits of said calling line designation.

9. In a telephone system, in combination with a plurality of lines and a called line, each of said lines having an individual designation composed of digits, an impulser producing time-spaced impulses, a plurality of groups of connections between the said line and said impulser, each of said groups of connections being individual to one of said lines and arranged to express the individual designation thereof, a sender, connections between said impulser and said sender, means responsive to one of said lines when calling said called line, means responsive to said last-mentioned means for registering the designation of said called line in said sender, and a register having a digital registering capacity of less than the total number of digits in both the designation of one of said calling lines and said called line, said register being repetitively operable by said time-spaced impulses under the control of said sender to register said called line designation over said connections between said sender and said impulser, and to register said calling line designation over the group of connections between said calling line and said impulser.

RALPH E. HERSEY.

REFERENCES CITED

The following references are of record in the file of this patent:

UNITED STATES PATENTS

| Number | Name | Date |
|---|---|---|
| 2,112,951 | Carpenter | Mar. 5, 1938 |
| 2,165,924 | Goodrum | July 11, 1939 |
| 2,270,246 | Bascom | Jan. 20, 1942 |
| 2,273,165 | Wright | Feb. 17, 1942 |
| 2,294,870 | Holden et al. | June 2, 1942 |
| 2,351,551 | Seibel | June 13, 1944 |
| 2,369,071 | Ostline | Feb. 6, 1945 |